United States Patent
Gates et al.

(10) Patent No.: US 10,070,539 B2
(45) Date of Patent: Sep. 4, 2018

(54) ELECTRICAL JUNCTION WITH WIRELESS CONTROLLER

(71) Applicant: Advanced Currents Corporation, Edina, MN (US)

(72) Inventors: Doug Gates, Farmington, MI (US); Steve Carle, Edina, MN (US)

(73) Assignee: Advanced Currents Corporation, Edina, MN (US)

( * ) Notice: Subject to any disclaimer, the term of this patent is extended or adjusted under 35 U.S.C. 154(b) by 0 days.

(21) Appl. No.: 15/499,256

(22) Filed: Apr. 27, 2017

(65) Prior Publication Data

US 2017/0318691 A1 Nov. 2, 2017

Related U.S. Application Data

(60) Provisional application No. 62/328,178, filed on Apr. 27, 2016.

(51) Int. Cl.
*H02G 3/08* (2006.01)
*H05K 5/00* (2006.01)
*H02G 3/16* (2006.01)
*H02G 3/12* (2006.01)

(52) U.S. Cl.
CPC .......... *H05K 5/0017* (2013.01); *H02G 3/081* (2013.01); *H02G 3/08* (2013.01); *H02G 3/086* (2013.01); *H02G 3/12* (2013.01); *H02G 3/16* (2013.01)

(58) Field of Classification Search
CPC .......... H02G 3/081; H02G 3/16; H02G 3/086; H02G 3/12; H02G 3/08; H05K 5/0017
See application file for complete search history.

(56) References Cited

U.S. PATENT DOCUMENTS

| | | |
|---|---|---|
| 1,938,309 A | 12/1933 | Williams |
| 2,433,917 A | 1/1948 | McCartney |
| 2,908,743 A | 10/1959 | Premoshis |
| 3,609,647 A | 9/1971 | Castellano |
| 3,635,305 A | 1/1972 | Kunishi et al. |
| 3,814,834 A | 6/1974 | Glader |
| 4,050,770 A | 9/1977 | Rigo |
| 4,165,443 A | 8/1979 | Figart et al. |
| 4,273,957 A | 6/1981 | Kolling, Jr. |
| 4,500,746 A | 2/1985 | Meehan |
| 4,842,551 A | 6/1989 | Heimann |
| 4,918,258 A | 4/1990 | Ayer |
| 4,924,032 A | 5/1990 | Akins |
| 4,976,631 A | 12/1990 | Harlow, Jr. |
| 5,015,203 A | 5/1991 | Furrow |
| 5,380,951 A | 1/1995 | Comerci et al. |

(Continued)

*Primary Examiner* — James Wu
(74) *Attorney, Agent, or Firm* — Dicke, Billig & Czaja, PLLC

(57) ABSTRACT

One aspect is an electrical junction with wireless controller configured for attachment in a building structure. The junction includes a junction body having surfaces defining an opening. A junction device is coupled to the opening of the junction body and a wireless controller is coupled to the junction body. An external conductor routs voltage from a voltage source in the building structure into the junction body. The wireless controller is electrically coupled between the external conductor and the junction device and is mechanically coupled to the junction body behind a surface of the building structure.

20 Claims, 7 Drawing Sheets

(56) References Cited

U.S. PATENT DOCUMENTS

| | | |
|---|---|---|
| 5,471,012 A | 11/1995 | Opel |
| 5,525,754 A | 6/1996 | Akins |
| 5,785,551 A | 7/1998 | Libby |
| 5,925,850 A | 7/1999 | Park |
| 5,934,935 A | 8/1999 | Kameyama |
| 5,975,938 A | 11/1999 | Libby |
| 6,045,374 A | 4/2000 | Candeloro |
| 6,099,348 A | 8/2000 | Horton |
| 6,120,165 A | 9/2000 | Shalvi |
| 6,156,971 A | 12/2000 | May |
| 6,201,187 B1 | 3/2001 | Burbine |
| 6,239,365 B1 | 5/2001 | McEvers |
| 6,376,580 B1 | 4/2002 | Ikuta et al. |
| 6,376,770 B1 | 4/2002 | Hyde |
| 6,425,773 B2 | 7/2002 | Mosebach et al. |
| 6,514,652 B2 | 2/2003 | Cash, Jr. |
| 6,544,049 B1 | 4/2003 | Pierson, Jr. |
| 6,558,190 B1 | 5/2003 | Pierson, Jr. |
| 6,617,511 B2 | 9/2003 | Schultz et al. |
| 6,644,987 B2 | 11/2003 | Meleck |
| 6,740,810 B1 | 5/2004 | Regueiro |
| 6,786,766 B1 | 9/2004 | Chopra |
| 6,937,461 B1 | 8/2005 | Donahue, IV |
| 6,945,815 B1 | 9/2005 | Mullally |
| 7,034,222 B1 | 4/2006 | York |
| 7,160,147 B1 | 1/2007 | Stephan |
| 7,425,677 B2 | 9/2008 | Gates et al. |
| 7,705,239 B2 | 4/2010 | Gates et al. |
| 8,415,561 B2 * | 4/2013 | Gates .................. H01R 13/508 174/481 |
| 8,461,503 B2 | 6/2013 | Leinen |
| 8,509,683 B2 | 8/2013 | Woytowitz |
| 8,731,689 B2 | 5/2014 | Platner et al. |
| 8,766,799 B2 | 7/2014 | Gray et al. |
| 2008/0011501 A1 | 1/2008 | Gates et al. |
| 2009/0008120 A1 | 1/2009 | Gates et al. |
| 2010/0186982 A1 | 7/2010 | Gates et al. |
| 2010/0280677 A1 * | 11/2010 | Budike, Jr. ........ H05B 37/0272 700/296 |
| 2014/0203090 A1 | 7/2014 | Edwards et al. |

* cited by examiner

ELECTRICAL JUNCTION WITH WIRELESS CONTROLLER

CROSS-REFERENCE TO RELATED APPLICATIONS

This Non-Provisional Patent Application claims the benefit of the filing dates of U.S. Provisional Patent Application Ser. No. 62/328,178, filed Apr. 27, 2016, entitled "WIRELESS CONTROLLER INCORPORATED WITH JUNCTION BOX" which is herein incorporated by reference.

BACKGROUND

One aspect relates to an electrical junction with a wireless controller. Electrical circuitry installation associated with building construction typically involves routing wires from a circuit breaker panel to individual electrical junctions dispersed throughout the building. These electrical junctions may be electrical enclosures, such as junction boxes for line voltages, or may be mounting frames for low-voltage applications. Typically, wires are also routed between electrical junctions. These electrical junctions will eventually hold light fixtures or junction devices such as switches and receptacles. These light fixtures, switches and receptacles are coupled to the conductors or wires that are circulated from other electrical junctions or from the circuit breaker panel.

More recently, wireless devices have been made available to control certain electrical devices wirelessly. For example, wireless device adaptors may be plugged into receptacles, such as an outlet, such that any device then plugged into the wireless adaptor is then wirelessly controlled. However, it is often cumbersome and complicated to have such adaptors in communication with each other. Also, wireless adaptors integrated into devices that eventually wear out, such as light bulbs, require that the wireless adaptors must be thrown out and be replaced as well. For these and other reasons, there is a need for the present invention.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
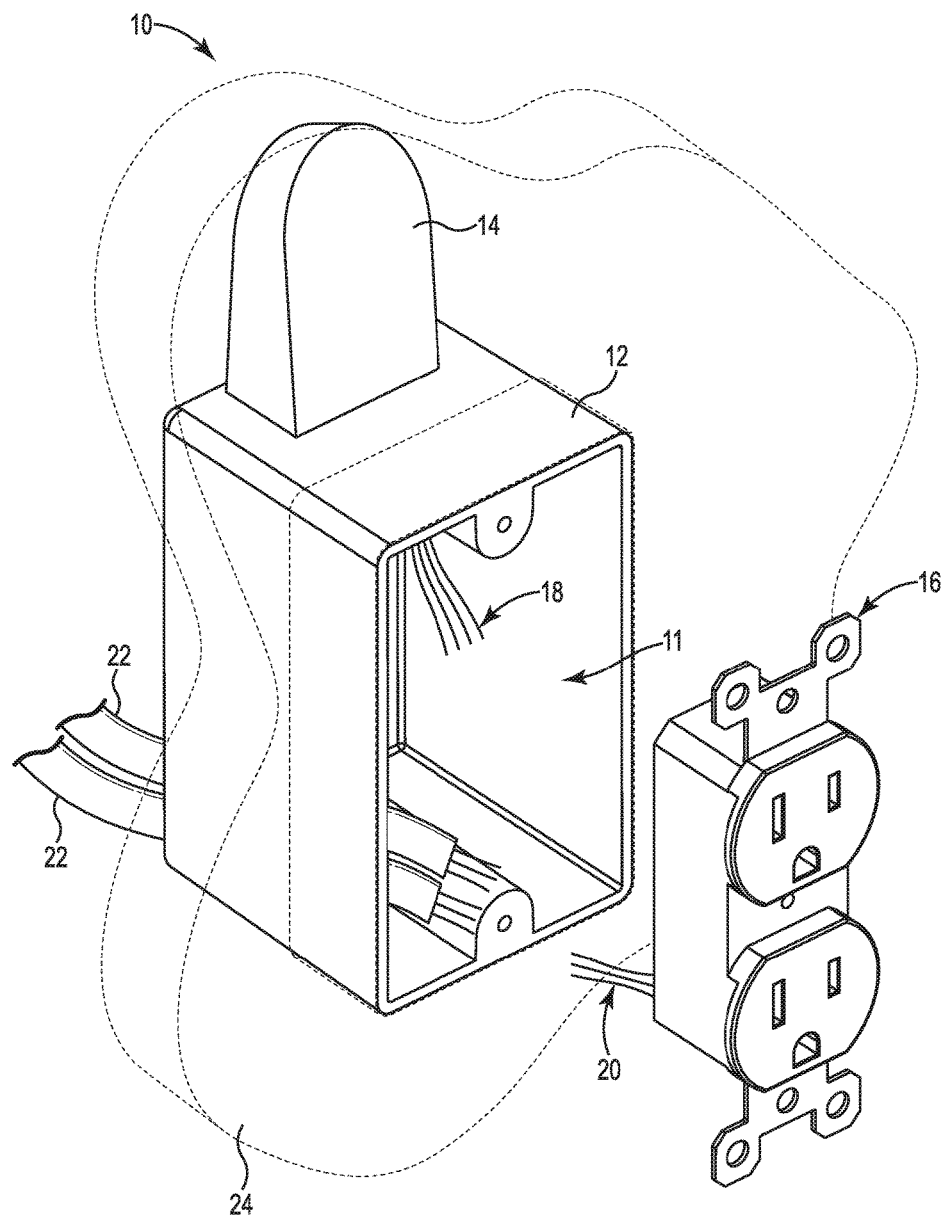
FIG. 1 illustrates a front perspective view of an electrical junction with wireless controller in accordance with one embodiment.

FIG. 1 illustrates electrical junction 10 in accordance with one embodiment. In one embodiment, electrical junction 10 includes body 12, wireless controller 14 and junction device 16. In one embodiment, body 12 is a junction box and junction device 16 is a receptacle. In one embodiment, wireless controller 14 includes wires 18 and junction device 16 includes pigtails or connecting wires 20.

In one embodiment, electrical junction 10 is configured to be connectable within a wall, ceiling, or floor of a building structure. In FIG. 1, surface 24 of the building structure is illustrated with dotted lines. In the illustration, surface 24 may be a wall, ceiling, or floor. As illustrated, junction 10 is partially embedded within the building structure such that a cavity 11 within the junction 10 is accessible on one side of surface 24, that is, accessible to a room or area within the building structure, while the remaining portions of the junction 10 are inaccessible and "behind" surface 24 of the building structure.

Electrical conductors or wiring 22 may then be routed from a circuit breaker panel or from an upstream power source on the same circuit within the building structure to electrical junction 10, which in one case is configured as a junction box. In one embodiment, the circuit breaker panel is configured to distribute current at line voltage (around 110 to 120 volts) to various electrical enclosures or junction boxes. In one embodiment, current may be distributed from a low-voltage source, such as a transformer, to electrical junction 10 at voltages less than 120 volts. In such embodiments with such lower-voltage sources, body 12 of electrical junction 10 may be a mounting frame.

In various embodiments, junction devices 16, such as receptacle outlets, switched receptacles, light switches, dimmer switches, fans, lights, fixtures and electrical appliances, are connected to electrical junction 10. In one embodiment, wireless controller 14 is coupled between wiring 22 and junction device 16, using one or more of wires 18. As such, in one embodiment junction device 16 is coupled to a voltage source via wiring 22 from the circuit breaker panel and through wireless controller 14. In this way, junction device 16 can be controlled remotely through wireless controller 14.

In various embodiments, wireless controller 14 includes embedded control hardware and software and is in wireless communication with a system controller that is located remotely from wireless controller 14. In this way, wireless controller 14 remotely and wirelessly measures electrical usage, monitors lights or other loads, performs dimming and other functions, and/or enables and disables receptacle outlets, switched receptacles, fans, lights, fixtures and any of a variety of electrical appliances. This may be done wirelessly and over a network, which may include internet connectivity, on devices connected at an electrical junction 10.

In one embodiment, wireless controller 14 is coupled to body 12 of electrical junction 10 in a permanent/integral manner. In other embodiments, wireless controller 14 is insertable, removable and replaceable through body 12 of electrical junction 10 without removing electrical junction 10 or any other part of surface 24 of the building structure that is considered to be permanently installed, such as drywall or other materials. In each embodiment, wireless controller 14 is mechanically secured to body 12 of electrical junction 10 securely enough that electrical junction 10 meets all pertinent UL and FCC regulations for electrical junction devices and wireless transmitters. For example, when wireless controller 14 is coupled to body 12 of electrical junction 10, whether permanently or removably, electrical junction 10 is in compliance with UL and FCC regulations and electrical codes and will pass UL testing standards for crush resistance, fire containment, etc.

As FIG. 1 illustrates, there are three layers of access to control over distribution of electrical current in a typical building structure: 1) permanent wiring, 2) replaceable distribution components, and 3) replaceable loads. For example, wire 22 coming into electrical junction 10, such as a high-voltage wire 22 from the circuit breaker panel, illustrates the permanent wiring of a building structure. Junction device 16, such as a receptacle outlet, illustrates replaceable distribution components. Anything that is plugged into junction device 16, such as a lamp or light, is an example of a replaceable load. These three layers, and their attributes, are summarized in Table 1 below.

remotely. Also, some "brick" type wireless devices can be inserted into receptacle outlets so that electrical appliances plugged into the brick can be controlled remotely. However, each of these type of solutions in the second and third layers of control over electrical current have shortcomings compared to the electrical junction 10 with embedded wireless controller 14.

Embedding wireless controller 14 in the permanent wiring of electrical junction 10 has the advantage that the wireless controller 14 is not visible from rooms or areas within the building structure. As illustrated in FIG. 1, wireless controller 14 is behind the surface 24 of the building structure, and thus, not visible. This is an aesthetic advantage to solutions that add bricks, causing ugly "wall warts" extending out from receptacle outlets.

Furthermore, because wireless controller 14 is secured behind surface 24 and integrated with the wiring, there is no risk of dislodgment and subsequent electrical arcing as there is with other "plug-in" solutions. Because the wireless controller 14, embedded in the permanent wiring, is typically only accessed by qualified electricians, it remains inaccessible to most others. This eliminates accidental problems caused when wireless devices are manipulated by those who do not fully understand the overall operation.

Figure 2:
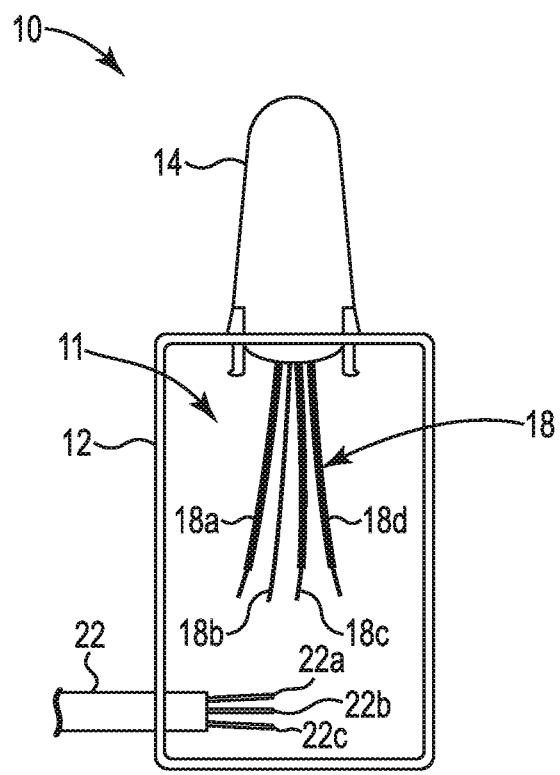
FIG. 2 illustrates a front view of an electrical junction with wireless controller in accordance with one embodiment.

FIG. 2 illustrates a front view of electrical junction 10 in accordance with one embodiment. In one embodiment, electrical junction 10 includes body 12 and wireless controller 14. No junction device is illustrated in the figure so that cavity 11 is fully visible. In one embodiment, electrical junction 10 is a single-gang junction box with a top surface, bottom surface, back surface and side surfaces, which collectively define cavity 11 that is open to a front side. In one embodiment, wireless controller 14 is mounted on the top surface of body 12. Once a junction device and faceplate is coupled to body 12, the front side of cavity 11 is closed off such that the electrical junction 10 is in compliance with UL and FCC regulations and electrical codes and will pass UL testing standards for crush resistance, fire containment, etc.

In one embodiment, wireless controller 14 includes wires 18. In one embodiment wires 18 include black or "hot" wires 18a and 18d, white or "neutral" wire 18c and ground wire 18b. Also, wires 22, for example, line-voltage wires from the

TABLE 1

Three layers of access to control over electrical current.

| Layer | Example | Replacement Frequency | |
|---|---|---|---|
| Replaceable Loads | Light Bulbs | High | Embedding network connectivity in these layers limits product choice, does not control a bank of lights or other loads and requires network maintenance at replacement of light bulbs, receptacles, etc. |
| Replaceable Distribution Components | Receptacles | Medium | |
| Permanent Wiring | 12, 14 gauge Conductors, cables | Low | Embedding network connectivity in this layer creates transparency to the user. It allows more product choice, controls an entire bank of lights or other loads and avoids network maintenance at replacement of light bulbs, receptacles, etc. |

As illustrated in FIG. 1, wireless controller 14 is embedded at the first layer of the permanent wiring. This approach has many advantages and avoids the shortcomings of solutions that use wireless devices in the second layer of receptacles, or in the third layer of replaceable loads, as will be illustrated and discussed further.

For example, some lightbulbs are embedded with wireless communication so that the bulb can then be turned on and off circuit breaker panel, include black or "hot" wire 22a, white or "neutral" wire 22b and ground wire 22c. In this way, black wire 22a from a line-voltage source is coupled to black wire 18a of wireless controller 14, white wire 22b is coupled to white wire 18c and ground wire 22c is coupled to ground wire 18b.

Black wire 18d from wireless controller 14 is then available to be coupled to a junction device. In this way, current to the junction device is controlled and monitored via wireless controller 14. As such, any of a variety of loads, such as lights, receptacles, fans, fixtures and any of a variety of electrical appliances are then controlled and monitored wirelessly by wireless controller 14.

Figure 3:
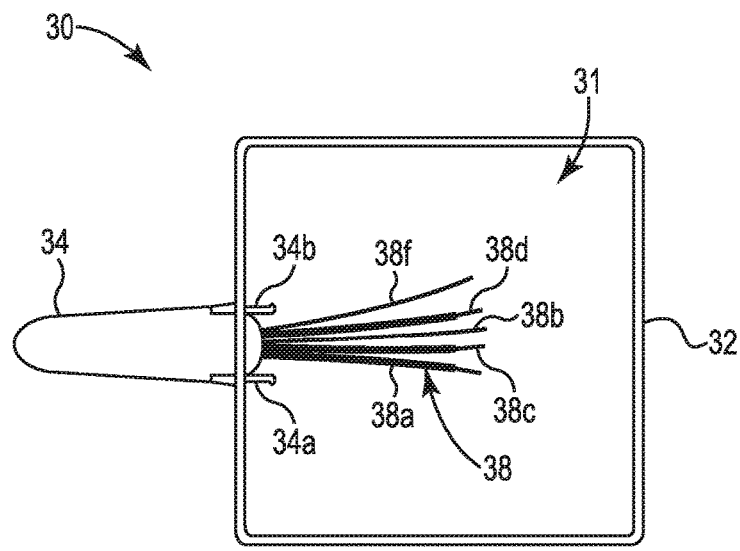
FIG. 3 illustrates a front view of an electrical junction with wireless controller in accordance with one embodiment.

FIG. 3 illustrates a front view of electrical junction 30 in accordance with one embodiment. In one embodiment, electrical junction 30 includes body 32 and wireless controller 34. No junction device is illustrated in the figure so that cavity 31 is fully visible. In one embodiment, electrical junction 30 is a double-gang junction box with a top surface, bottom surface, back surface and side surfaces, which collectively define cavity 31, which is open to a front side.

In one embodiment, wireless controller 34 includes first and second secure tabs 34*a* and 34*b*, which facilitate mounting wireless controller 34 to body 32. In one embodiment, body 32 is provided with an opening on a side surface that substantially matches the outer profile of wireless controller 34 adjacent first and second secure tabs 34*a* and 34*b*. In this way, wireless controller 34 can be inserted through the opening in body 32 and then snapped or secured thereto with first and second secure tabs 34*a* and 34*b*.

In one embodiment, where electrical junction 30 is a standard junction box, wireless controller 34 is insertable and removable through a non-standard opening in the otherwise standard line voltage junction box. In one embodiment, the opening in the junction box may be included as shipped from factory. In one embodiment, wireless controller 34 is configured to be insertable in a standard opening, such as a "knock-out" in the junction box. In another embodiment, such an opening can be cut into box in the field. The opening can be provided or cut into any of the surfaces of the electrical junction 30. In any case, once wireless controller 34 is inserted into body 32, electrical junction 30 is in compliance with UL and FCC regulations and electrical codes and will pass UL testing standards for crush resistance, fire containment, etc.

In one embodiment, wireless controller 34 includes wires 38. Similar to embodiments described above, wires 38 include black or "hot" wires 38*a* and 38*d*, white or "neutral" wire 38*c* and ground wire 38*b*. Accordingly, these wires 38 can be coupled to line-voltage wires from the circuit breaker panel, as well as to a junction device as previously discussed, such that current to junction device secured to electrical junction 30 is controlled and monitored via wireless controller 34.

In one embodiment, wires 38 additionally include low-voltage wire 38*f*. In some embodiments, some load devices, or third layer devices, may require a low-voltage source rather than a high-voltage source. As such, one embodiment of wireless controller 34 includes a step down voltage device or transformer that will convert line voltage to low voltage. For example, when a line-voltage source, such as 120 volts from a circuit breaker panel is coupled to black wire 38*a*, the step down voltage device within wireless controller 34 steps that voltage down, for example to 5 volts, which is then provided on low-voltage wire 38*f*.

Figure 4:
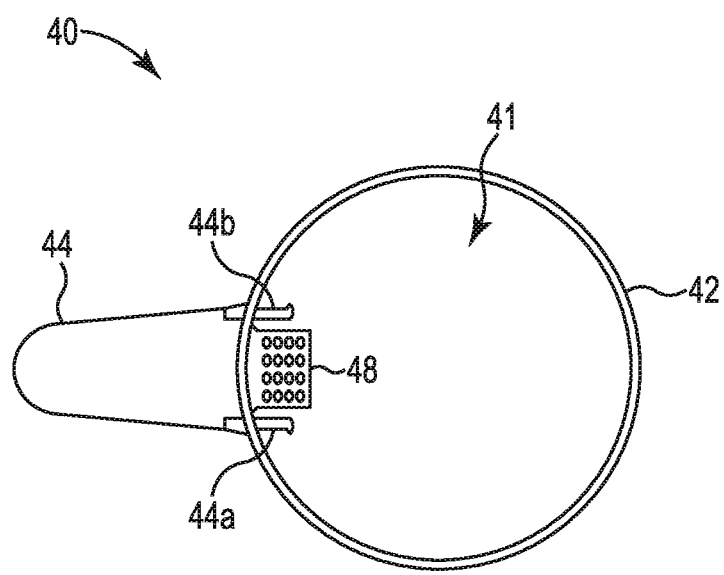
FIG. 4 illustrates a bottom view of an electrical junction with wireless controller in accordance with one embodiment.

FIG. 4 illustrates a bottom view of electrical junction 40 in accordance with one embodiment. In one embodiment, electrical junction 40 includes body 42 and wireless controller 44. No junction device is illustrated in the figure so that cavity 41 is fully visible. In one embodiment, electrical junction 40 is a light fixture junction box with a top surface and a side surface substantially forming a circle, the top and side surface together defining cavity 43 that is open to a bottom side. In one embodiment, wireless controller 44 is mounted on the side surface of body 42.

In one embodiment, body 42 is mounted in a ceiling of a building structure, such that substantially all of body 42, including all of wireless controller 44, is embedded above the surface of the ceiling and such that cavity 41 is exposed through the ceiling surface. In one embodiment, a light fixture is coupled to body 42 thereby closing off cavity 41 such that electrical junction 40 is in compliance with UL and FCC regulations and electrical codes and will pass UL testing standards for crush resistance, fire containment, etc.

In one embodiment, wireless controller 44 includes first and second secure tabs 44*a* and 44*b*, which facilitate mounting wireless controller 44 to body 42. In one embodiment, wireless controller 44 further includes push-in receptacles 48. Push-in receptacles 48 include a plurality of openings configured to accept wires from line-voltage sources (such as line-voltage from a circuit breaker panel), low-voltages sources, and from load devices, such as a light fixture.

In this way, similar to embodiments described above, wires from a voltage source can be coupled to wireless controller 44 via push-in receptacles 48, and wires from a load device, such as a light fixture can also be coupled to push-in receptacles 48. Accordingly, current to a load, such as a light fixture, secured to electrical junction 40 is controlled and monitored via wireless controller 44.

As is apparent from the embodiments illustrated in FIGS. 1-4, a wide variety of shapes of wireless controllers and electrical junction configurations enable insertability, removability and replaceability without removing the electrical junction or any permanent part of a building structure, such as drywall or other materials. Tabs, such as secure tabs 34*a* and 34*b* illustrated and described above, afford removability for the wireless controller from the electrical junction, but other alternatives are possible as well. For example, a wireless controller can be releasably secured to a junction box using a threaded base with a locking nut and a twist-in interference-based design, as well as other methods. Furthermore, a variety of shapes and configurations of the wireless controller and electrical junction configuration are possible with further embodiments.

Furthermore, it should be noted that any of the features and structures illustrated in FIGS. 1-4 (as well as those to be described below) can be used together, combined or swapped out in order to best facilitate any particular installation within a building structure. For example, embodiments illustrated with wires for the wireless controller can use push-pin receptacles, and those illustrated with push-pin receptacles for the wireless controller can use wires. Also, for example, in FIG. 2, junction 12 is illustrated as a single-gang junction box, for which a double-gang, light fixture junction box or other type of enclosure is readily substituted.

In some embodiments described above, the electrical junction is a line-voltage junction box. In other embodiments, where line-voltage is not routed to the electrical junction, the electrical junction can simply be a mounting frame. Where a wireless controller is integrated with a low-voltage source, a fully enclosed junction box may not be necessary and an open or partially open mounting frame can be used instead.

Figure 5:
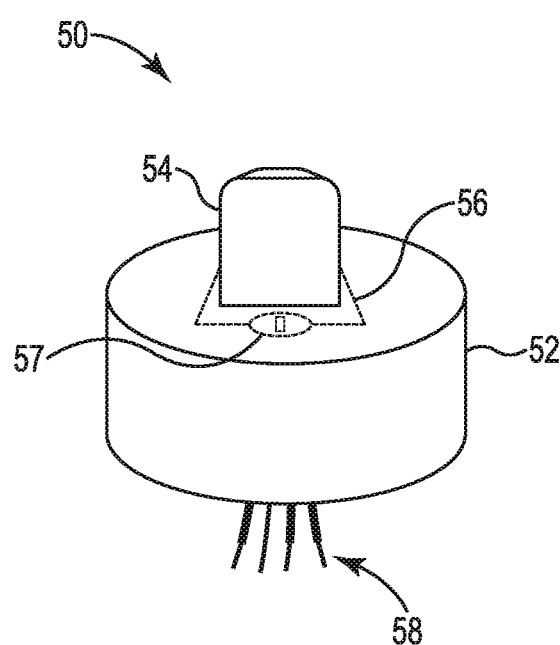
FIG. 5 illustrates a side perspective view of an electrical junction with wireless controller in accordance with one embodiment.

FIG. 5 illustrates a side view of electrical junction 50 in accordance with one embodiment. In one embodiment, electrical junction 50 includes body 52 and wireless controller 54. Wireless controller 54 includes wires 58 for connection with voltage sources and junction devices as previously described, such that current to junction devices, such as light fixtures, secured to electrical junction 50 is controlled and monitored via wireless controller 54.

In one embodiment, electrical junction 50 is a light fixture junction box with a top surface and a side surface substantially forming a circle. In one embodiment, wireless controller 54 is integral with, and optionally separable from, a removable section 56 of body 52. A release mechanism 57 may optionally be provided such that wireless controller 54 and removable section 56 are removable together through a portion of body 52, which remains affixed to the building structure. With wireless controller 54 and removable section 56 inserted and secured to body 52, and with release mechanism 57 secured, electrical junction 50 is in compliance with UL and FCC regulations and electrical codes and will pass UL testing standards for crush resistance, fire containment, etc.

In one embodiment, electrical junction 50 is mounted within a ceiling of a building structure, such that substantially all of body 52, including all of wireless controller 54, is embedded above the surface of the ceiling. Release mechanism 57 is then mounted such that it is exposed through the ceiling surface and is accessible on the same side of body 52 as wires 58. This configuration enables insertability, removability and replaceability of wireless controller 54 and removable section 56 without removing electrical junction 50 or any permanent part of a building structure, such as drywall or other materials. Once a light fixture is coupled to electrical junction 50, body 52 is closed off such that the junction box is in compliance with UL and FCC regulations and electrical codes and will pass UL testing standards for crush resistance, fire containment, etc.

In one embodiment, electrical junction 50 is provided with wireless controller 54 that is integral with, and not separable from, body 52. Specifically, removable section 56 and release mechanism 57 are not provided such that wireless controller 54 is formed as part of body 52. This embodiment of electrical junction 50 would also meet applicable UL and FCC regulations and electrical codes. In one embodiment, wireless control hardware that is within wireless controller 54 could be removable and replaceable.

Similar to embodiments described above, wires from a voltage source can be coupled to wireless controller 54 via wire 58, as can wires from a load device, such as a light fixture. Accordingly, current to junction devices, such as light fixtures, secured to electrical junction 50 is controlled and monitored via wireless controller 54.

Figure 6:
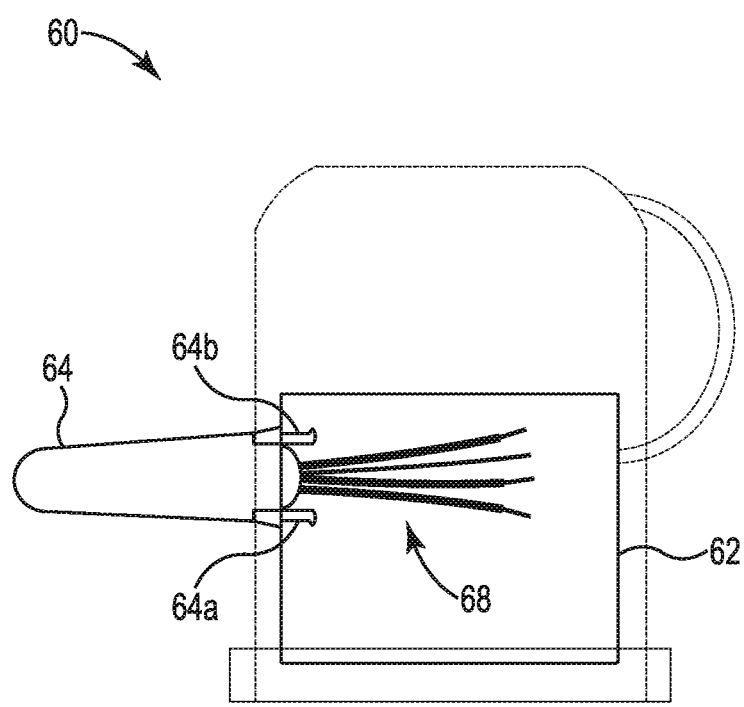
FIG. 6 illustrates a partially ghosted electrical junction incorporated as part of a recessed light fixture assembly with wireless controller in accordance with one embodiment.

FIG. 6 illustrates a side view of electrical junction 60 in accordance with one embodiment. In one embodiment, electrical junction 60 is a recessed light fixture assembly and includes body 62 and wireless controller 64. Wireless controller 64 includes wires 68 for connection with voltage sources and junction devices as previously described, such that current to a light bulb secured to electrical junction 60 is controlled and monitored via wireless controller 64.

As with previous designs, wireless controller 64 can be removable via secure tabs 64a and 64b, can be removable with other means, or can be integral with body 62 such that it is not removable. Also, as with previous embodiments, wireless controller 64 can be inserted into standard openings, such as a "knock-out", or inserted into a hole that is cut into box in the field. The opening can be provided or cut into any of the surfaces of the body 62. In any case, once wireless controller 64 is inserted into body 62, electrical junction 60 is in compliance with UL and FCC regulations and electrical codes and will pass UL testing standards for crush resistance, fire containment, etc.

Figure 7:
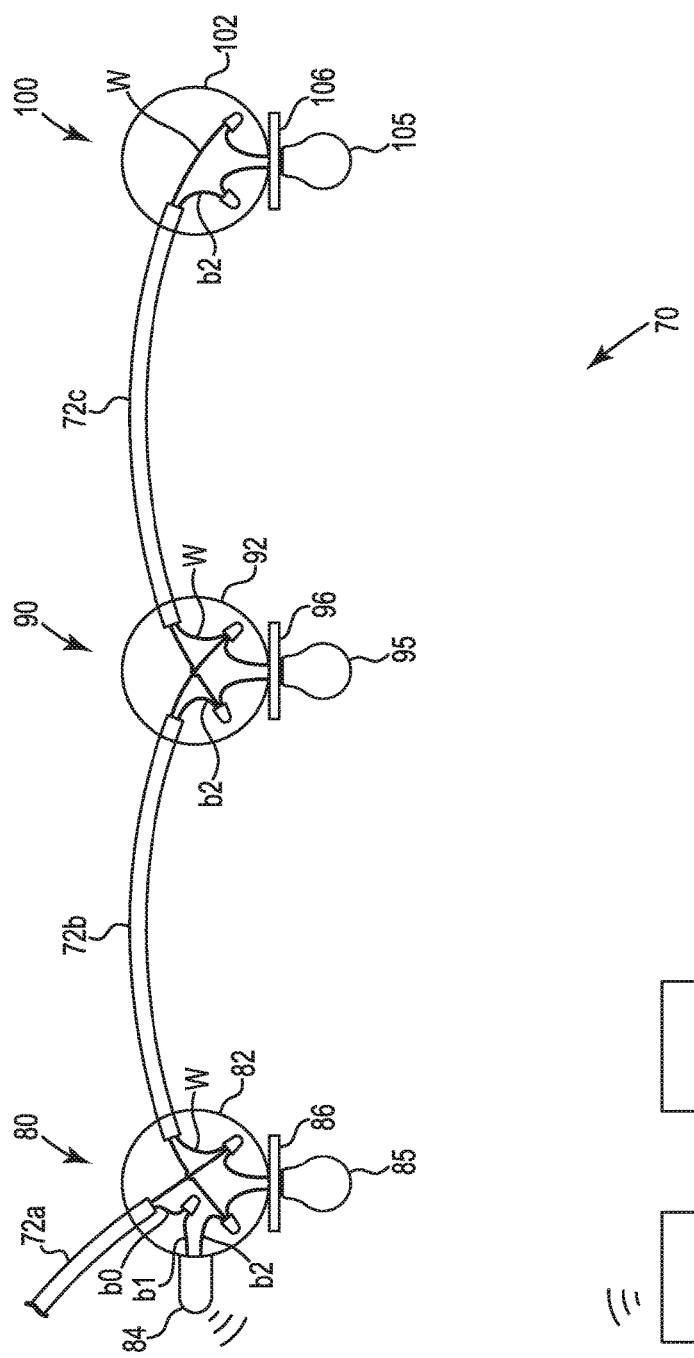
FIG. 7 illustrates a wireless system including multiple electrical junctions controlled with a single wireless controller in accordance with one embodiment.

FIG. 7 illustrates a wireless system 70 in accordance with one embodiment. In one embodiment, wireless system 70 includes electrical junctions 80, 90, and 100, system controller 110 and interface device 115. In one embodiment, electrical junctions 80, 90, and 100 are a bank of light fixtures that are controlled by system controller 110.

In one embodiment, electrical junctions 80, 90, and 100 each include a body 82, 92, 102 that are respectively coupled to junction devices 86, 96 and 106, which in one embodiment are light fixtures. Junction devices 86, 96 and 106 each respectively include a light bulb 85, 95, 105. Electrical junction 80 also includes wireless controller 84. Wireless controller 84 includes embedded control hardware and software and is in wireless communication with system controller 110, which is located remotely from wireless controller 84. For example, while wireless controller 84 is embedded in a ceiling of a building structure, system controller 110 can be located in an office or data center within the building or even adjacent the building structure. System controller 110 includes hardware and software that provides a variety of monitor and control function to wireless controller 84. Interface device 115 allows a user to control and manipulate system controller 110.

In one embodiment, system controller 110 remotely and wirelessly measures electrical usage, monitors lights or other loads, performs dimming and other functions, and/or enables and disables receptacle outlets, switched receptacles, fans, lights, fixtures and any of a variety of electrical appliances. This may be done wirelessly and over a network, which may include internet connectivity.

In one embodiment, a source voltage is routed to electrical junction 80 via wire 72a. In one embodiment, wire 72a is coupled to a line-voltage source, such as from a circuit breaker panel. In the illustration, electrical junction 80 is coupled to electrical junction 90 via wire 72b, and electrical junction 90 is coupled to electrical junction 100 via wire 72c. In one embodiment, electrical junctions 80, 90, 100 form a bank of junctions, such as a bank of lights. In the illustration, three junctions are illustrated, but any number of junctions can be included in a bank of junctions.

In one embodiment, wire 72a is coupled to a line-voltage source and includes a black (hot) wire b0, and a white (neutral) wire W. Typically, wiring from a line-voltage source also includes a ground wire, but this is not illustrated in FIG. 7 in order to simplify the drawing. In one embodiment, black wire b0 from the voltage source is coupled to a black wire b1 at an input of wireless controller 84. A second black wire b2 from wireless controller 84 is then coupled from an output of wireless controller 84 to an input of junction device 86, as well as to any additional junction devices (96, 106) that are to be controlled by wireless controller 84. White wire W from the voltage source is coupled to an output side of the junction device 86, as well as to any additional junction devices (96, 106) that are to be controlled by wireless controller 84. White wire W from the voltage source can also be coupled to neutral input of wireless controller 84, but is not illustrated to simplify the drawing. Furthermore, a low-voltage output, such as illustrated in FIG. 3, may also be provided.

As illustrated in FIG. 7, in one embodiment of wireless system 70 wireless controller 84 controls a number of electrical junctions 80, 90, and 100, by feeding output black wire b2 to any number of junction devices (86, 96, 106) within electrical junctions. In this way, a single wireless controller 84 is able to control one, two, three, ten or any number of electrical junctions and related junction devices.

Furthermore, additional electrical junctions can be coupled to source black wire b0 from the line-voltage source, and in this way, would not be controlled by wireless controller 84. This would provide uninterrupted voltage source to supply downstream electrical junctions, which may be a useful option or addition in certain applications.

In addition, because the wireless controller is hardwired at the first layer of permanent wiring, it is not visible from rooms within the building structure. Furthermore, it is not readily or directly accessible from an interior room of the building structure, such that an unskilled person is unlikely to dislodge or otherwise jeopardize its operation. Because wireless controller is integrated into the permanent wiring associated with the electrical junction, only qualified electricians are likely to have access to it.

As is apparent from the illustration, one embodiment of wireless system 70 only requires wiring 72 from a voltage source and then between each body (82,92,102). In this way, no wiring is needed between each of electrical junctions 80, 90, and 100 and a control switch, as would be required in a conventional wiring system. Avoiding wiring each of electrical junctions 80, 90, and 100 to a switch, such as a light switch, avoids the costs of the wire itself, and more importantly in most instances, the cost of labor associated with such wiring installation. For a significant sized building, these cost savings can easily be in the thousands of dollars.

In one embodiment, system controller 110 is a microprocessor-based system with wireless communications capability to communicate with wireless controller 84. In one embodiment, interface device 115 is a personal computer, tablet device or cell phone that is coupled in any of a variety of ways with system controller 110, such as wired connection, Bluetooth connection, Wi-Fi connection and/or internet connection. Interface device 115 can control and/or manipulate system controller 110 to control or adjust wireless controller 84. For example, a user could use interface device 115, such as a cell phone, to adjust a program on system controller 110 to turn on a bank of lights at 7:00 a.m. each day.

In a more simplified embodiment, system controller 110 can be a simple switch, which could appear as a conventional light switch, for example. In such an embodiment, an interface device 115 may not be needed or optional. In this way, a wireless light switch can be installed in a wall as a typical light switch, but no wiring is needed between it and electrical junctions 80, 90, and 100, because they are wirelessly coupled via wireless controller 84.

As exemplified in FIG. 7 and the other embodiments, wireless hardware, such as wireless controllers 14, 24, 34, 44, 54, 64, 84, is embedded in permanent wiring of the first layer, any device, light bulb or any other load becomes wirelessly controllable. As such, a user is not limited to those devices and bulbs with wireless control functionality. Conventional junction devices, outlet receptacle, light bulbs, etc., all become wirelessly controllable without having to upgrade or change these conventional devices.

In addition, because of this integration into the permanent wiring, an entire bank of lights or other loads, for example, can be controlled from a single upstream product installation. By contrast, individual light bulbs or other individual brick-type loads with embedded wireless hardware require every light or every load on the bank to have the hardware to be controlled wirelessly. Also, each time such individually integrated wireless controller wears out, each one must be replaced.

In addition to the expense of replacing these items, there is a negative environmental impact of throwing away the "wireless guts," such as when changing a wireless light bulb. This causes more rare earth metals mining, more toxic waste and is more expensive to the homeowner who has to "re-purchase" the wireless component with each replacement.

Furthermore, by integrating wireless control directly into the wiring layer of an electrical system, the user is free to replace components and devices in higher layers without disturbing any network communications. By contrast, if the wireless hardware is located within higher layers, as it is with products currently on the market, any time a component, device or load containing wireless hardware is replaced, network settings must be updated to re-establish communication and control. This essentially requires the user to be a network administrator to restore wireless control functionality every time a light bulb is changed, for instance.

Additionally, this approach is superior to locating a wireless controller fully inside the junction box. Positioning the wireless controller outside the primary wall or ceiling footprint of the junction box, as this approach does, aids in avoiding signal interference by locating the antenna away from metallic components of related assemblies, connected devices and coiling of conductor wires contained inside the junction box. This positioning also avoids the exceeding of the rated volume capacity of a junction box by not consuming volume inside the junction box, but, instead, extending outside of it.

In addition, for each of the embodiments above, the wireless controller is mechanically secured to body of the electrical junction securely enough that the electrical junction meets all UL and FCC regulations for electrical junction devices, including passing UL testing standards for crush resistance, fire containment, etc.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electrical junction with a wireless controller configured for attachment in a building structure, the electrical junction comprising:
   a junction body having surfaces defining a cavity accessible via an opening in the body;
   an external conductor routing line-voltage from a line-voltage source in the building structure into the cavity of the junction body;
   a junction device coupled to the opening of the junction body;
   wherein the wireless controller is mechanically coupled to the junction body and extending outside the cavity, is electrically coupled between the external conductor and the junction device, and is fully enclosed against the junction body such that the wireless controller is open exclusively to the junction body cavity; and
   a system controller remote from the electrical junction that is in wireless communication with the wireless controller and that controls or monitors the junction device;
   wherein the mechanical coupling between the wireless controller and the junction body is secure and enclosed such that the electrical junction meets UL regulations and applicable electrical building codes.

2. The electrical junction of claim 1, wherein the wireless controller is embedded in a permanent wiring of a first layer of a building structure wiring.

3. The electrical junction of claim 1, wherein the wireless controller is removable through the opening of the junction body thereby providing access to the wireless controller through the cavity even when the electrical junction is installed in the building structure and without removing any part of the building.

4. The electrical junction of claim 1, wherein the wireless controller includes tabs or threaded sections extending into the junction body thereby coupling the wireless controller to the junction body.

5. The electrical junction of claim 1, wherein the wireless controller is integrally formed with the junction body.

6. The electrical junction of claim 1, wherein the wireless controller extends outside the junction body such that no part of the wireless controller is within the cavity of the junction body.

7. The electrical junction of claim 1, wherein the wireless controller is mounted behind a wall, ceiling or surface of the building structure such that it is not readily accessible to interior rooms of the building structure.

8. The electrical junction of claim 1, wherein the junction device is one of a group comprising a receptacle outlet, a switched receptacle, a switch, a dimmer switch, a fan, a light, a fixture and an electrical appliance.

9. A wireless system configured for attachment in a building structure, the system comprising:
   a plurality of electrical junctions, at least one such electrical junction comprising:
      a junction body having surfaces defining a cavity accessible via an opening in the body;
      an external conductor routing line-voltage from a line-voltage source in the building structure into the cavity of the junction body;
      a junction device coupled to the opening of the junction body; and
      a wireless controller that is mechanically coupled to the junction body and extending outside the cavity, that is electrically coupled between the external conductor and the junction device and that is fully enclosed against the junction body such that the wireless controller is open exclusively to the junction body cavity; and
   a system controller remote from the plurality of electrical junctions that is in wireless communication with the wireless controller and that controls or monitors at least the junction device.

10. The electrical junction of claim 9, wherein the wireless controller is embedded in a permanent wiring of a first layer of a building structure wiring.

11. The electrical junction of claim 9, wherein each of the plurality of electrical junctions comprise the junction device and wherein the wireless controller controls each of the junction devices.

12. The electrical junction of claim 9, further comprising an interface device in communication with the system controller such that control of the wireless controller by the system controller can be adjusted with the interface device.

13. The electrical junction of claim 9, wherein the wireless controller is mounted behind a wall, ceiling or surface of the building structure such that it is not readily accessible to interior rooms of the building structure.

14. An electrical junction with a wireless controller configured for attachment in a building structure, the electrical junction comprising:
   a junction body having surfaces defining an opening;
   a junction device coupled to the opening of the junction body;
   the wireless controller coupled to the junction body; and
   an external conductor routing voltage from a voltage source in the building structure into the junction body;
   wherein the wireless controller is electrically coupled between the external conductor and the junction device, is mechanically coupled to the junction body behind a surface of the building structure and that is fully enclosed against the junction body such that the wireless controller is open exclusively to the junction body opening.

15. The electrical junction of claim 14, further comprising a system controller remote from the electrical junction that is in wireless communication with the wireless controller and that controls or monitors the junction device.

16. The electrical junction of claim 14, wherein the mechanical coupling between the wireless controller and the junction body is secure such that the electrical junction meets UL regulations and electrical building codes.

17. The electrical junction of claim 14, wherein the external conductor routing voltage is routing line-voltage from a line-voltage source.

18. The electrical junction of claim 14, wherein the wireless controller is integral with a permanent wiring of a first layer of a building structure wiring.

19. The electrical junction of claim 14, wherein the wireless controller extends outside the junction body such that no part of the wireless controller is within the cavity of the junction body.

20. The electrical junction of claim 14, wherein the wireless controller is mounted behind a wall, ceiling or surface of the building structure such that it is not readily accessible to interior rooms of the building structure.

* * * * *